United States Patent
Jacoby et al.

(10) Patent No.: US 9,077,765 B2
(45) Date of Patent: Jul. 7, 2015

(54) CONTENT MANAGEMENT AND DELIVERY

(71) Applicants: James T. Jacoby, Sammamish, WA (US); Rajendra H. Vishnumurty, Bellevue, WA (US); Yu Zhang, Redmond, WA (US)

(72) Inventors: James T. Jacoby, Sammamish, WA (US); Rajendra H. Vishnumurty, Bellevue, WA (US); Yu Zhang, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 221 days.

(21) Appl. No.: 13/648,180

(22) Filed: Oct. 9, 2012

(65) Prior Publication Data

US 2014/0101281 A1    Apr. 10, 2014

(51) Int. Cl.
*G06F 15/16* (2006.01)
*H04L 29/08* (2006.01)
*H04W 4/18* (2009.01)

(52) U.S. Cl.
CPC ............. *H04L 67/2823* (2013.01); *H04W 4/18* (2013.01); *H04L 67/327* (2013.01)

(58) Field of Classification Search
CPC ..... H04L 67/28; H04L 67/2823; H04L 65/60; H04L 65/601; H04L 65/605; H04N 21/20; H04N 21/23
USPC .................. 709/203, 217, 223, 206, 219, 246
See application file for complete search history.

(56) References Cited

U.S. PATENT DOCUMENTS

| | | | |
|---|---|---|---|
| 7,181,468 B2 | 2/2007 | Spring et al. | |
| 8,069,264 B2 * | 11/2011 | Smith et al. | 709/246 |
| 8,136,142 B2 * | 3/2012 | Alexander et al. | 725/105 |
| 8,145,793 B1 | 3/2012 | Belanger et al. | |
| 8,185,096 B2 | 5/2012 | Smith et al. | |
| 8,250,180 B2 * | 8/2012 | Hayashi et al. | 709/246 |
| 2002/0194195 A1 | 12/2002 | Fenton et al. | |
| 2003/0110155 A1 * | 6/2003 | Minagawa | 707/1 |
| 2005/0131970 A1 * | 6/2005 | Salazar et al. | 707/205 |
| 2005/0182675 A1 * | 8/2005 | Huettner | 705/14 |

(Continued)

FOREIGN PATENT DOCUMENTS

WO    2011001407 A1    1/2011

OTHER PUBLICATIONS

Cranor, et al., "Enhanced Streaming Services in a Content Distribution Network", Retrieved at <<http://spar.isi.jhu.edu/~mgreen/prism_ic.pdf>>, IEEE Internet Computing archive, vol. 5 Issue 4, Jul. 2001,pp. 10.

(Continued)

*Primary Examiner* — Ramy M Osman
(74) *Attorney, Agent, or Firm* — Bryan Webster; Kate Drakos; Micky Minhas

(57) ABSTRACT

Systems and methods for delivering digital content are provided. In one example, a method may include registering a plurality of content source servers and a plurality of content delivery servers with a content management server. The method may include providing a respective inbound content adapter for each of the content source servers, the inbound adapter configured to generate canonical source data. The method may further include providing a respective outbound content adapter for each of the content delivery servers, the outbound adapter configured to process the canonical source data according to a data contract for the respective content delivery server and generate deliverable content data appropriate for the associated content delivery server.

20 Claims, 7 Drawing Sheets

(56) References Cited

U.S. PATENT DOCUMENTS

| | | |
|---|---|---|
| 2007/0051798 A1* | 3/2007 | Kawai et al. .................. 235/382 |
| 2007/0100648 A1* | 5/2007 | Borquez et al. .................. 705/1 |
| 2008/0222201 A1 | 9/2008 | Chen et al. |
| 2009/0012992 A1 | 1/2009 | Gill et al. |
| 2011/0219099 A1* | 9/2011 | Smith et al. .................. 709/219 |
| 2012/0109937 A1 | 5/2012 | Liensberger et al. |
| 2013/0024545 A1* | 1/2013 | Sheppard et al. ............. 709/217 |

OTHER PUBLICATIONS

ISA European Patent Office, International Search Report & Written Opinion for Patent Application No. PCT/US2013/063157, Feb. 12, 2014, 13 pages.

* cited by examiner

CONTENT MANAGEMENT AND DELIVERY

BACKGROUND

Digital content developers and other content sources may produce and/or host digital content, such as games, music, applications, images, etc., as well as metadata related to such content. Such sources may publish the digital content and related metadata to various destination systems, such as game marketplaces, search servers, application marketplaces, etc., that have a need for the content. Such destination systems may in turn make the digital content available to end users and other client systems.

Each destination system that receives digital content may accept only content that conforms to a particular data structure of that system. Accordingly, to publish digital content to a destination system, a content source typically transforms its digital content by converting the content to match the destination system's accepted data structure. Thus, to publish its digital content to multiple destination systems that each utilize different data structures, a content source has to perform separate data structure conversions for each of the destination system data structures.

If a content source desires to publish its content to a new destination system, the content source has to build a new data structure conversion that corresponds to the new destination system's data structure. Should a destination system change its accepted data structure, each content source that publishes to the destination system has to correspondingly update its data structure conversion processes.

Managing multiple data structure conversion processes and monitoring multiple destination systems' accepted data structures for changes increases source system complexities and expenses. Further, should a source system provide digital content to a destination system in an unacceptable data structure, such content will not be published by the system. In this situation, such content may not reach end users and client systems that desire the content.

SUMMARY

To address the above issues, systems and methods for managing and delivering content are provided. In one example, the method may include registering a plurality of content source servers and a plurality of content delivery servers with a content management server. The plurality of content source servers may include game console content servers, music content servers, and/or mobile device application content servers. The content delivery servers may include game console marketplace servers, search servers, mobile device application marketplace servers, and/or personal computer application marketplace servers.

Each of the content source servers may be configured to serve raw source content data of a different predetermined type. The predetermined raw source content data types may include game console applications, music files, and mobile device applications. Each of the content delivery servers may be configured to serve deliverable content data of a different predetermined type to end content consumable clients over a wide area network. The predetermined data types for the deliverable content data may include game console applications, searchable images, video, web pages, music files, mobile device applications, and personal computer applications. The deliverable content data may be formatted according to a data contract for each of the content delivery servers.

The method may include providing a respective inbound content adapter for each of the content source servers. The respective inbound content adapter may be configured to receive the raw source content data from the associated content source server and process the raw source content according to a publishing canonical data model to thereby generate canonical source data.

The method may further include providing a respective outbound content adapter for each of the content delivery servers. The respective outbound content adapter may be configured to process the canonical source data according to the data contract for the respective content delivery server, and thereby generate deliverable content data of a data type that is appropriate for the associated content delivery server.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
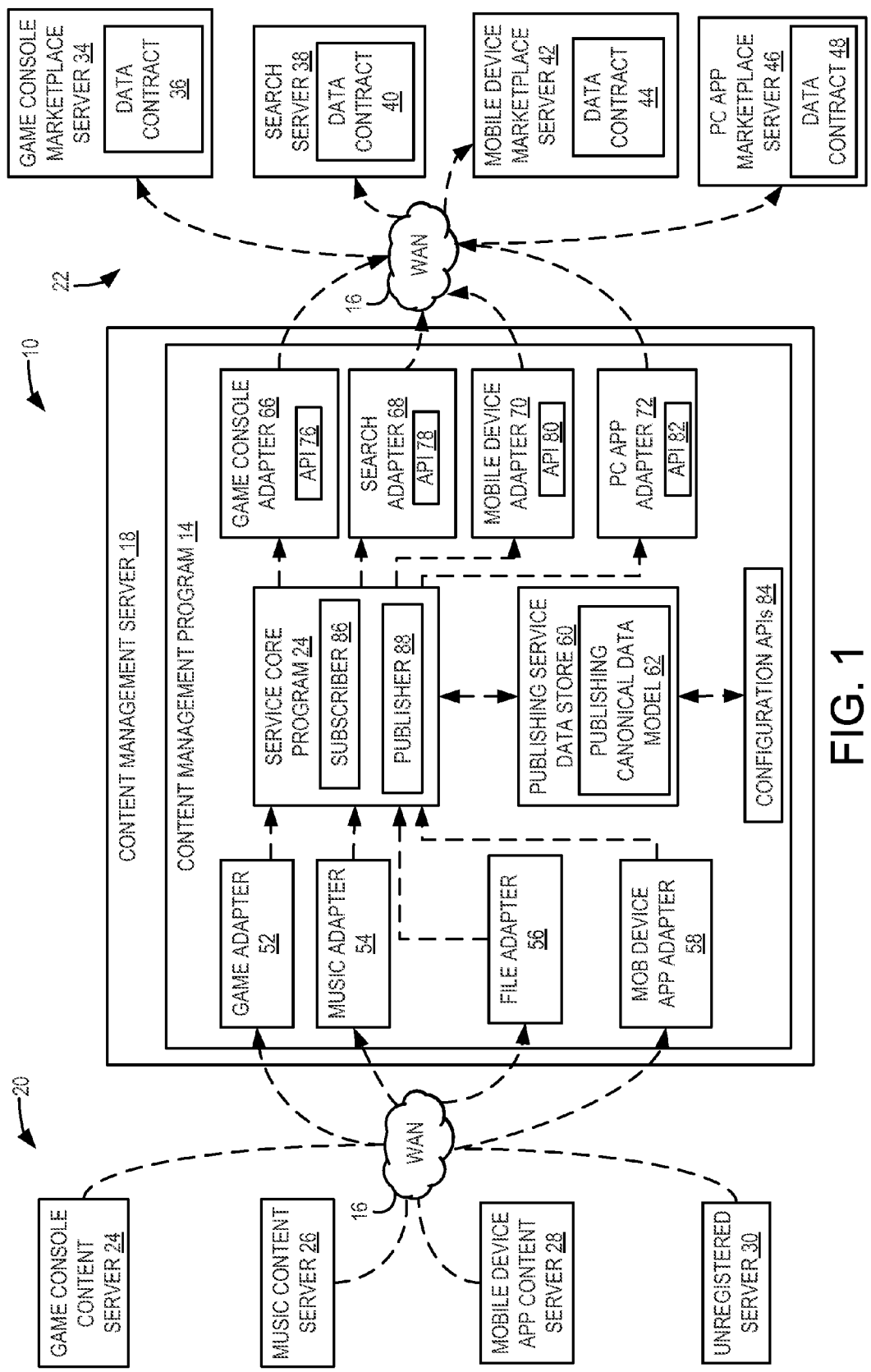
FIG. 1 is a schematic view of a content management system according to an embodiment of the present disclosure.

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included herein are schematic and generally not drawn to scale. Rather, the various drawing scales, aspect ratios, and numbers of components shown in the figures may be purposely distorted to make certain features or relationships easier to see.

FIG. 1 is a schematic view of one embodiment of a content management system 10 for receiving and processing raw source content data into deliverable content data, and delivering the deliverable content data to content delivery servers. In one example, the content management system 10 may be located within an internal network running on one or more servers. The internal network may comprise, for example, a local area network (LAN), wide area network (WAN), personal area network (PAN), or a combination thereof. It will be appreciated that in other examples the content management system 10 may be implemented across one or more other networks, such as separate WANs, PANs, or combinations thereof, and including the Internet.

The content management system 10 may include a content management program 14 that resides on a content management server 18. As described in more detail below, the content management server 18 may communicate with one or more content source servers and one or more content delivery servers via a network, such as the internal network described above or a separate WAN, PAN, or a combination thereof, and including the Internet. In one example, the content management server 18 communicates with content source servers via WAN 16. The content management program 14 may include a service core program 32 that facilitates the discovery, receiving and processing of raw source content data into deliverable content data that is published and delivered to the content delivery servers.

The content management program 14 comprises instructions that may be stored in mass storage of a computing device. The content management program 14 may be loaded into memory and executed by a processor of the computing device to perform one or more of the methods and processes described in more detail below. Similarly, the service core program 32 may be stored in mass storage of a computing device, loaded into memory and executed by a processor of the computing device.

The above-referenced computing devices may take the form of a desktop computer, network computer, server, or other suitable type of computing device. Additional details regarding the components and computing aspects of the above-referenced computing devices are described in more detail below with reference to FIG. 6.

With continued reference to FIG. 1, the content management program 14 may be configured to receive raw source content data from a plurality of content source servers 20. The content management program 14 may also be configured to register the plurality of content source servers 20. In the example depicted in FIG. 1, the registered content source servers 20 include a game console content server 24, a music content server 26, and a mobile device application content server 28. An unregistered content source server 30 may also provide raw source content data to the content management program 14. For example, the content management program 14 may be configured to dynamically discover raw source content data from a data feed of the unregistered content source server 30 via a public API of the unregistered server.

Each of the content source servers 20 may be configured to serve raw source content data, including descriptive metadata, of a different predetermined type. In the example depicted in FIG. 1, the game console content server 24 may be configured to serve game console applications along with corresponding descriptive metadata. The music content server 26 may be configured to serve music files along with corresponding descriptive metadata. The mobile device application content server 28 may be configured to serve mobile device applications along with corresponding descriptive metadata. The unregistered server 30 may be configured to serve web pages and links to video files and image files along with corresponding descriptive metadata. It will be appreciated that the content management program 14 may receive raw source content data from other content source servers, registered and unregistered, that produce and/or host other types of digital content.

Figure 2:
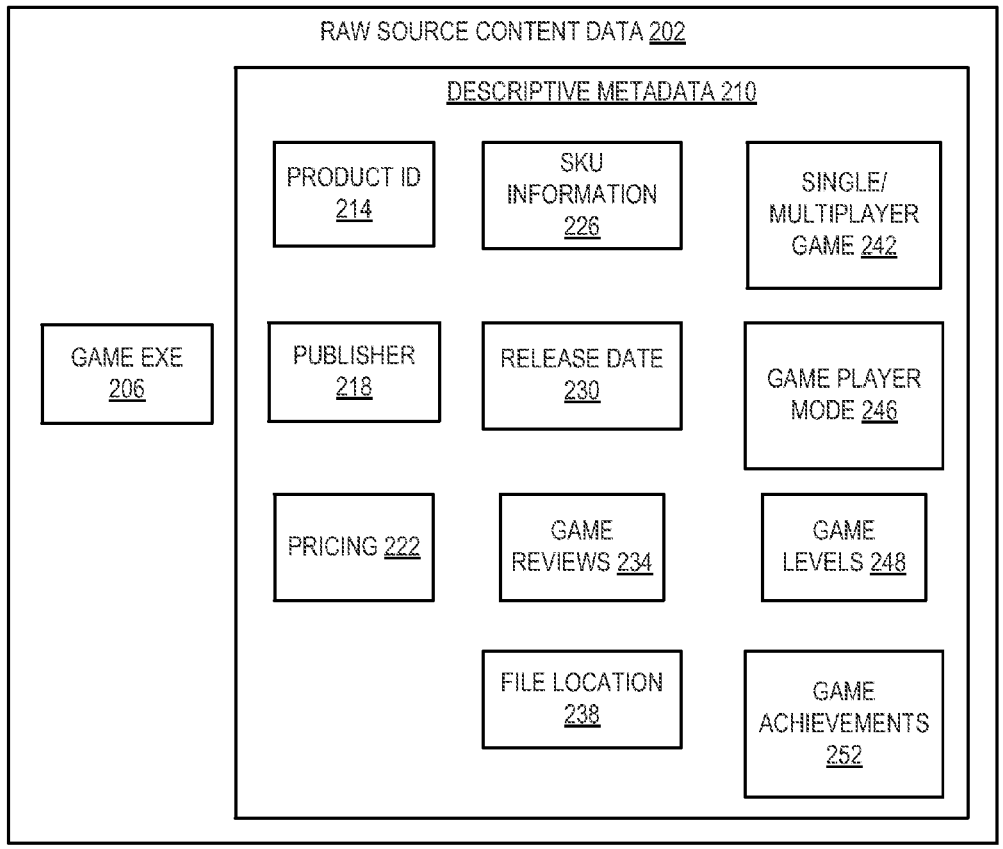
FIG. 2 is a diagram illustrating one example of raw source content data from a content source.

With reference now to FIG. 2, one example of raw source content data 202 that may be served by the mobile device application content server 28 is provided. In this example the raw source content data 202 is a video game in the form of a mobile device application. The application includes a game executable 206 and descriptive metadata 210 that provides various information related to the video game. The application may be configured to run on a mobile device, and may also be configured to connect to an on-line multiplayer gaming service.

The descriptive metadata 210 may include various information that describes, identifies, characterizes, or otherwise relates to the associated video game. In one example, the descriptive metadata 210 may include product identification (ID) data 214, publisher data 218, pricing data 222, SKU information 226, release date data 230, game review data 234, file location data 238, single/multiplayer game data 242, game player mode data 246, game level data 248 and game achievement data 252. The file location data 238 may further include a link to the video game application executable located on the game console content server 24 or on another server. It will be appreciated that in other examples the descriptive metadata 210 may include other information that describes, identifies, characterizes, or otherwise relates to the associated video game. Additionally, it will be appreciated that in other examples involving other types of digital content, various other types of descriptive metadata that describe, identify, characterize, or otherwise relate to the content may be used.

With reference again to FIG. 1, the content management program 14 may also be configured to register a plurality of content delivery servers 22 that are configured to receive deliverable content data of different predetermined types from the content management program. The content delivery servers 22 are also configured to serve such deliverable content data to end content consumable clients over WAN 16. In the example depicted in FIG. 1, the content delivery servers 22 include a game console marketplace server 34, a search server 38, a mobile device marketplace server 42, and a PC application marketplace server 46.

Each of the content delivery servers 22 includes an associated data contract—the game console marketplace server 34 including data contract 36, the search server 38 including data contract 40, the mobile device marketplace server 42 including data contract 44, and the PC application marketplace server 46 including data contract 48. Each of the data contracts defines one or more particular data structures in which incoming deliverable content data for that content delivery server is to be formatted. In one example, the data contracts for each of the content delivery servers 22 prescribe different data structures for incoming deliverable content data.

Each of the content delivery servers 22 may be configured to receive deliverable content data, including descriptive metadata, of a different predetermined type, and to serve such data to end content consumable clients. In the example depicted in FIG. 1, the game console marketplace server 34 may be configured to receive and serve game console applications. The search server 38 may be configured to receive and serve searchable images, video, web pages and music files. The mobile device marketplace server 42 may be configured to receive and serve mobile device applications. The PC application marketplace server 46 may be configured to receive and serve personal computer applications. It will also be appreciated that in some examples, two or more content delivery servers 22 may also receive and/or serve deliverable content data of the same type.

The content management program 14 may include a plurality of respective inbound content adapters that are configured to receive raw source content data from associated content source servers 20. As explained in more detail below, each inbound content adapter may then process the raw source content data according to a publishing canonical data model to thereby generate canonical source data.

In the example depicted in FIG. 1, an inbound game content adapter 52 may be configured to receive raw source content data from the game console content server 24. An inbound music content adapter 54 may be configured to receive raw source content data from the music content server 26. An inbound file content adapter 56 may be configured to receive raw source content data from the unregistered server 30. An inbound mobile device application content adapter 58 may be configured to receive raw source data content from the mobile device application content server 28.

The content management program 14 may also include a publishing service data store 60 and a publishing canonical data model 62. Advantageously, each of the inbound content adapters processes raw source content data it receives according to the same publishing canonical data model 62 to generate canonical source data. Further, the content management program 14 may provide canonical source data to one or more respective outbound content adapters that are each associated with a content delivery server 22. Each outbound content adapter may be configured to process the canonical source data according to the data contract for the respective content delivery server, and thereby generate deliverable content data of a data type that is appropriate for the associated content delivery server.

In the example depicted in FIG. 1, an outbound game console content adapter 66 may be configured to receive canonical source data from the service core program 32, and process the data according to the data contract 36 for the game console marketplace server 34 to thereby generate deliverable content data appropriate for this server. The outbound game console content adapter 66 may utilize an application programming interface (API) 76 provided by the game console marketplace server 34 to process the data according to the associated data contract 36. An outbound search content adapter 68 may be configured to receive canonical source data from the service core program 32 and process the data according to the data contract 40 for the search server 38 to thereby generate deliverable content data appropriate for this server. The outbound search content adapter 68 may utilize an API 78 provided by the search server 38 to process the data according to the associated data contract 40.

An outbound mobile device application content adapter 70 may be configured to receive canonical source data from the service core program 32 and process the data according to the data contract 44 for the mobile device marketplace server 42 to thereby generate deliverable content data appropriate for this server. The outbound mobile device application content adapter 70 may utilize an API 80 provided by the mobile device marketplace server 42 to process the data according to the associated data contract 44. An outbound PC application content adapter 72 may be configured to receive canonical source data from the service core program 32 and process the data according to the data contract 48 for the PC application marketplace server 46 to thereby generate deliverable content data appropriate for this server. The outbound PC application content adapter 72 may utilize an API 82 provided by the PC application marketplace server 46 to process the data according to the associated data contract 48.

Figure 3:
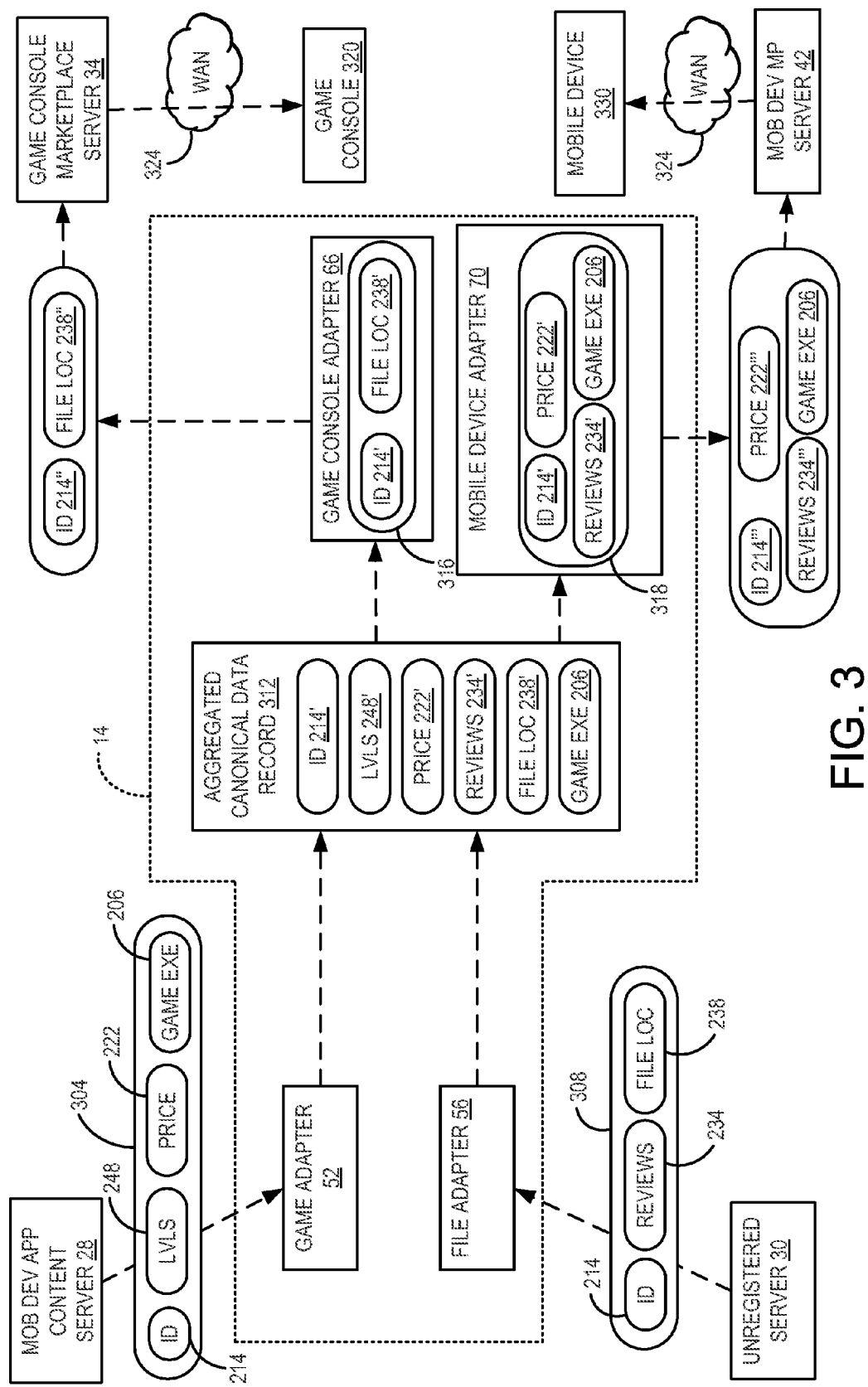
FIG. 3. is a schematic view of one example of raw source content data being aggregated and grouped into disparate canonical data subsets that are delivered to respective content delivery servers.

FIG. 3 provides an example of the raw source content data 202 described above with reference to FIG. 2 being received and processed by the content management program 14 and then delivered to respective content delivery servers. In this example, the inbound game content adapter 52 receives raw source content data portion 304 that includes the game executable 206 and elements of the descriptive metadata 210. More specifically, in this example the game content adapter 52 receives product ID data 214, game levels data 248 and pricing data 222 related to the associated video game.

The inbound file content adapter 56 may receive raw source content data portion 308 that includes different descriptive metadata also related to the video game associated with the game executable 206. In this example, the file content adapter 56 may receive the product ID data 214, published review data 234 of the video game, and file location data 238 indicating one or more locations from which the game executable 206 may be downloaded. For example, the file location data 238 may include a URL of the mobile device application content server 28 hosting the game executable 206.

In one example, the inbound game content adapter 52 and the inbound file content adapter 56 may dynamically discover descriptive metadata related to the game executable 206 and associated video game by locating such metadata that is associated with the product ID data 214 of the video game.

Both the inbound game content adapter 52 and the inbound file content adapter 56 may process the respective descriptive metadata they receive by transforming the descriptive metadata according to the publishing canonical data model 62 to generate canonical metadata. Advantageously and as described in more detail below, by utilizing a single publishing canonical data model 62 the content management program 14 provides a convenient content delivery mechanism that allows multiple content source servers 20 to distribute raw source content data to multiple content delivery servers 22 without the need to customize such data to match the various data contracts of the content delivery servers. It will be appreciated that in this example, only the descriptive metadata is transformed according to the publishing canonical data model 62, while the binaries of the game executable 206 remain unchanged.

The descriptive metadata in the raw source content data portions 304 and 308 may be transformed to canonical source data that is aggregated into an aggregated canonical data record 312. More specifically, the aggregated canonical data record 312 may include canonical product ID data 214', canonical game level data 248', canonical pricing data 222', canonical review data 234', canonical file location data 238', and the game executable 206.

The outbound content adapters may be configured to process the canonical metadata of the aggregated canonical data record 312 by transforming the canonical metadata to deliverable metadata according to the data contract for the respective content delivery server, thereby generating deliverable metadata. Additionally, and with reference also to FIG. 1, the service core program 32 may be configured to utilize configuration APIs 84 for each of the content delivery servers 22 to map the canonical source data to one or more of the content delivery servers based on a respective deliverable content data type for the associated content delivery server. In this manner, the content management program 14 may select pertinent descriptive metadata from the aggregated canonical data record for one or more of the content delivery servers 22.

In the example depicted in FIG. 3, a game console canonical data subset 316 including the canonical product ID data 214' and the canonical file location data 238' may be selected and provided to the outbound game console content adapter 66. In this manner, a subset of the descriptive metadata that may be pertinent and of particular relevance to the game console marketplace server 34 and its associated client devices may be selected.

Similarly, a mobile device marketplace canonical data subset 318 including the canonical product ID data 214', the canonical pricing data 222', the canonical product review data 234' and the game executable 206 may be selected and provided to the outbound mobile device application content adapter 70. In this manner, a subset of the descriptive metadata that may be pertinent and of particular relevance to the mobile device marketplace server 42 and its associated client devices may be selected.

The game console content adapter 66 may be configured to process the game console canonical metadata by transforming the metadata to generate deliverable metadata according to the data contract 36 for the respective game console marketplace server 34. In this manner and with reference again to FIG. 3, the canonical product ID data 214' may be transformed to deliverable product ID data 214", and the canonical file location data 238' may be transformed to deliverable file location data 238". This deliverable metadata may then be served to the game console marketplace server 34, which may in turn serve the deliverable metadata to a end content consumable client game console 320 over WAN 324.

In a similar manner, the mobile device application content adapter 70 may be configured to process the mobile device canonical metadata by transforming the metadata to generate deliverable metadata according to the data contract 44 for the respective mobile device marketplace server 42. With reference again to FIG. 3, the canonical product ID data 214' may be transformed to deliverable product ID data 214''', the canonical pricing data 222' may be transformed to deliverable pricing data 222''', and the canonical product review data 234' may be transformed to deliverable product review data 234'''. This deliverable metadata along with the game executable 206 may then be served to the mobile device marketplace server 42 which may in turn serve the deliverable metadata to an end content consumable client mobile device 330 over WAN 324.

Advantageously and as described above, the content management system 10 may enable raw source content data 202, such as an application and corresponding descriptive metadata, to be published to various content delivery servers 22. More specifically, the content management system 10 may transform the descriptive metadata that is appropriate for each content delivery server according to the data contract for that content delivery server. In this manner, for example, a content developer may write a single application capable of running on multiple platforms, which the content management system 10 may serve to multiple content delivery servers 22 with transformed descriptive metadata that is appropriate for each content delivery server, and without changing the application. Advantageously, the system 10 thereby enables a developer to write a single application that the system may publish to multiple content delivery servers 22.

Figure 4:
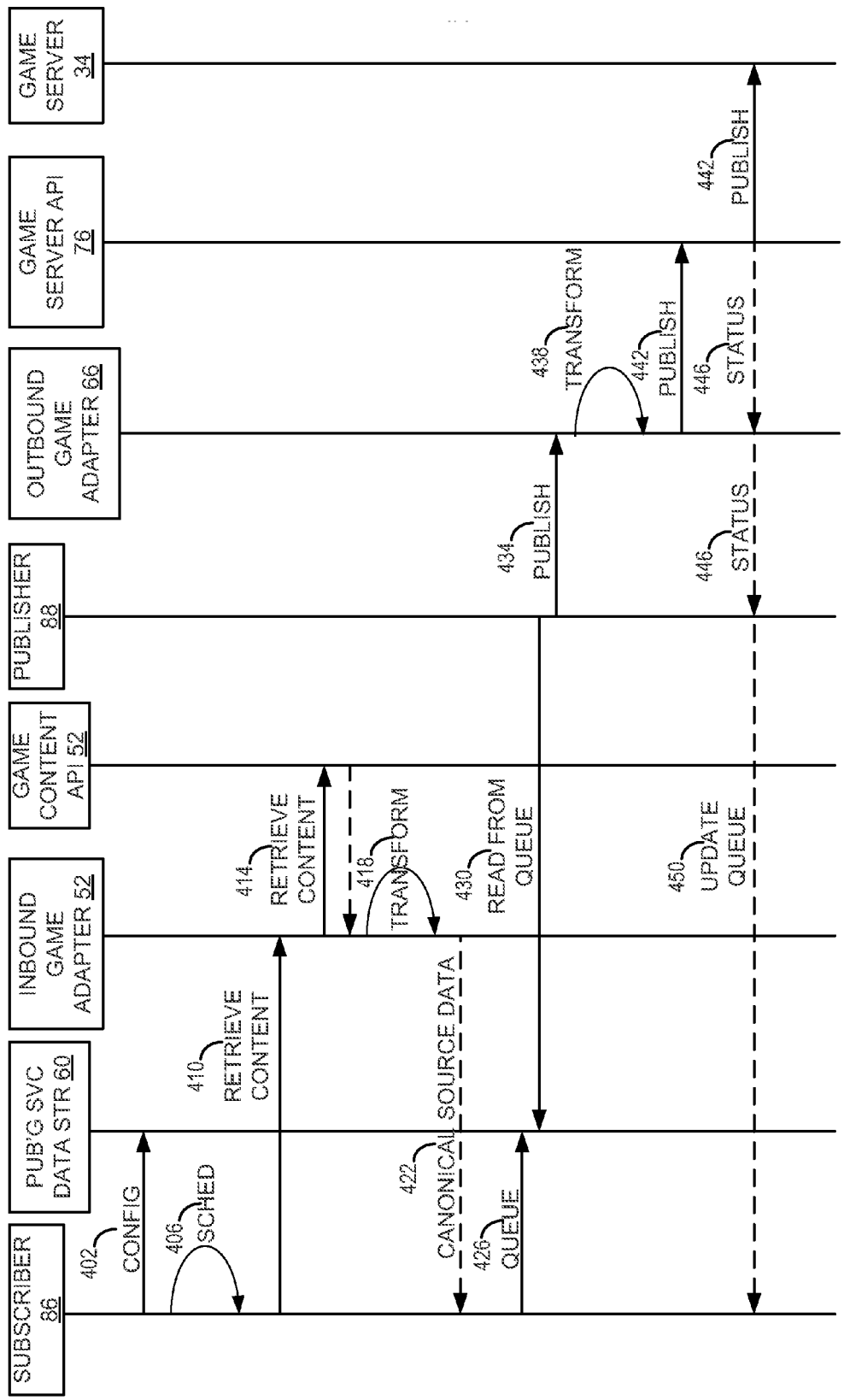
FIG. 4 is a diagram illustrating one example of an operational sequence of the content management system of FIG. 1.

With reference now to FIG. 4, an example of an operational sequence of the content management system 10 is provided. With reference also to FIG. 1, a subscriber 86 within the service core program 32 may subscribe to read a data feed from one or more content servers. In one example, the subscriber may subscribe to a data feed from the game console content server 24 via a game content API 90. At 402 the subscriber 86 may read a configuration file in the publishing service data store 60 at a predetermined interval. At 406 the subscriber 86 may schedule one or more jobs to review the data feed from the fame console content server 24 and any other subscribed data feeds to identify any newly available raw source content data.

At 410 the subscriber sends a request to retrieve new raw source content data to the inbound game content adapter 52. At 414 the inbound game content adapter 52 sends a request to the game content API 90 to retrieve new raw source content data. Upon receiving new raw source content data, at 418 the inbound game content adapter 52 processes the raw source content data according to the publishing canonical data model 62 to transform the data into canonical source data.

At 422 the subscriber receives an acknowledgement that the transformation into canonical source data has occurred and the canonical source data is saved in the publishing data store 60. At 426 the subscriber saves to a queue in the publishing service data store 60 a new record that the transformation into canonical source data has occurred. At 430 a publisher 88 may read from the queue in the publishing service data store 60 and locate the new record of the canonical source data. In one example, the publisher 88 may read from the queue periodically and asynchronously as compared to the predetermined interval at which the subscriber 86 reviews data feeds from the content server 24 and any other servers.

At 434 the publisher may send a request to the outbound game console content adapter 66 to publish the canonical source data to the game console marketplace server 34. At 438 the outbound game console content adapter 66 may process the canonical source data according to the data contract 36 of the game console marketplace server 34 to transform the canonical source data into deliverable content data. At 442 the outbound game console content adapter 66 may publish the deliverable content data via the game console marketplace server API 76 to the game console marketplace server 34. At 446 the game console marketplace server 34 may send a status acknowledgement of receipt of the deliverable content data to the outbound game console content adapter 66 and publisher 88 via the game console marketplace server API 76. At 450 such status acknowledgement may also be delivered to the queue in the publishing service data store 60, where an updated record may be saved noting that the deliverable content data has been published to the game console marketplace server 34.

Figure 5A:
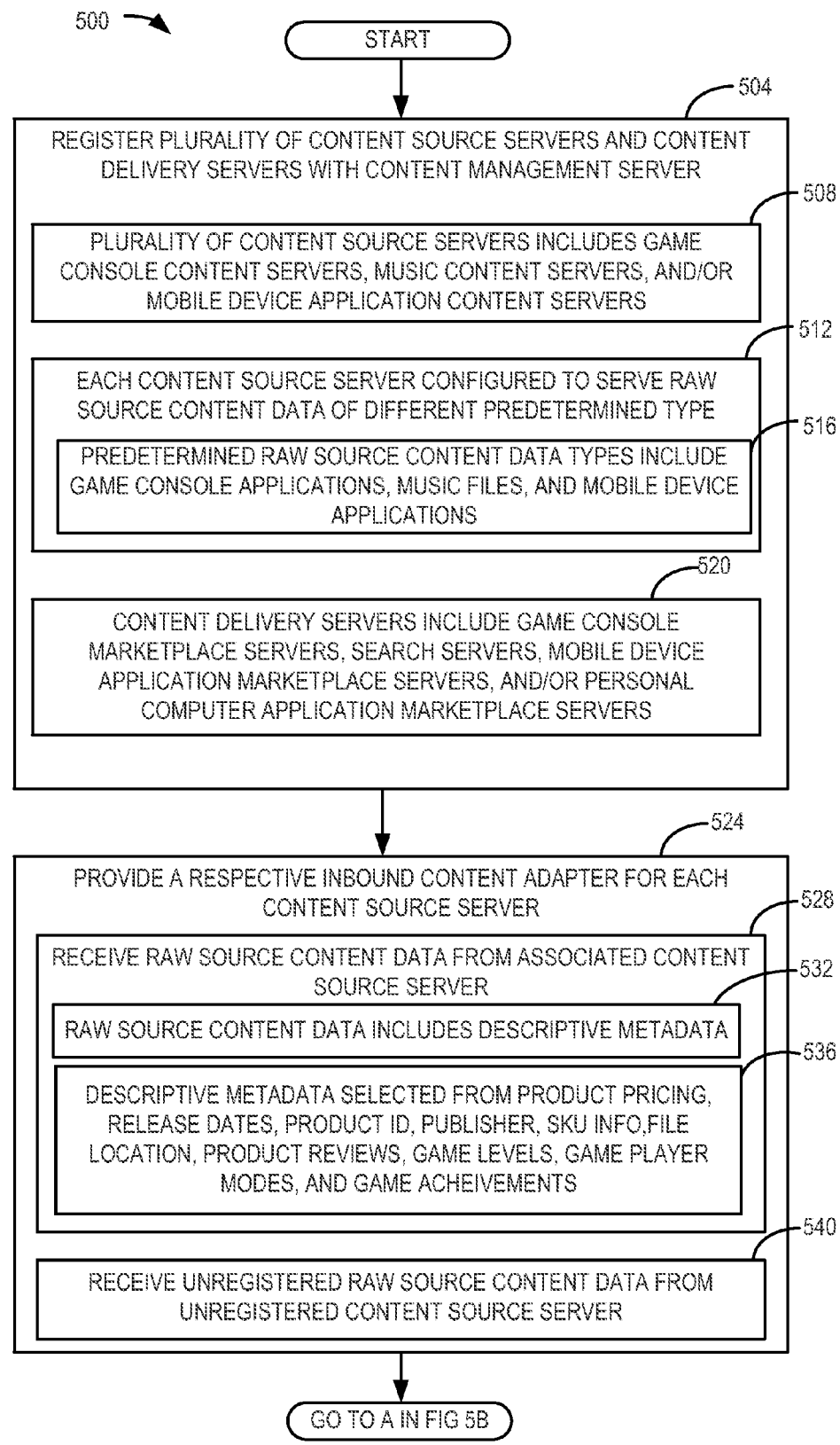
FIGS. 5A, 5B and 5C are a flow chart of a content delivery method according to an embodiment of the present disclosure.
Figure 5B:
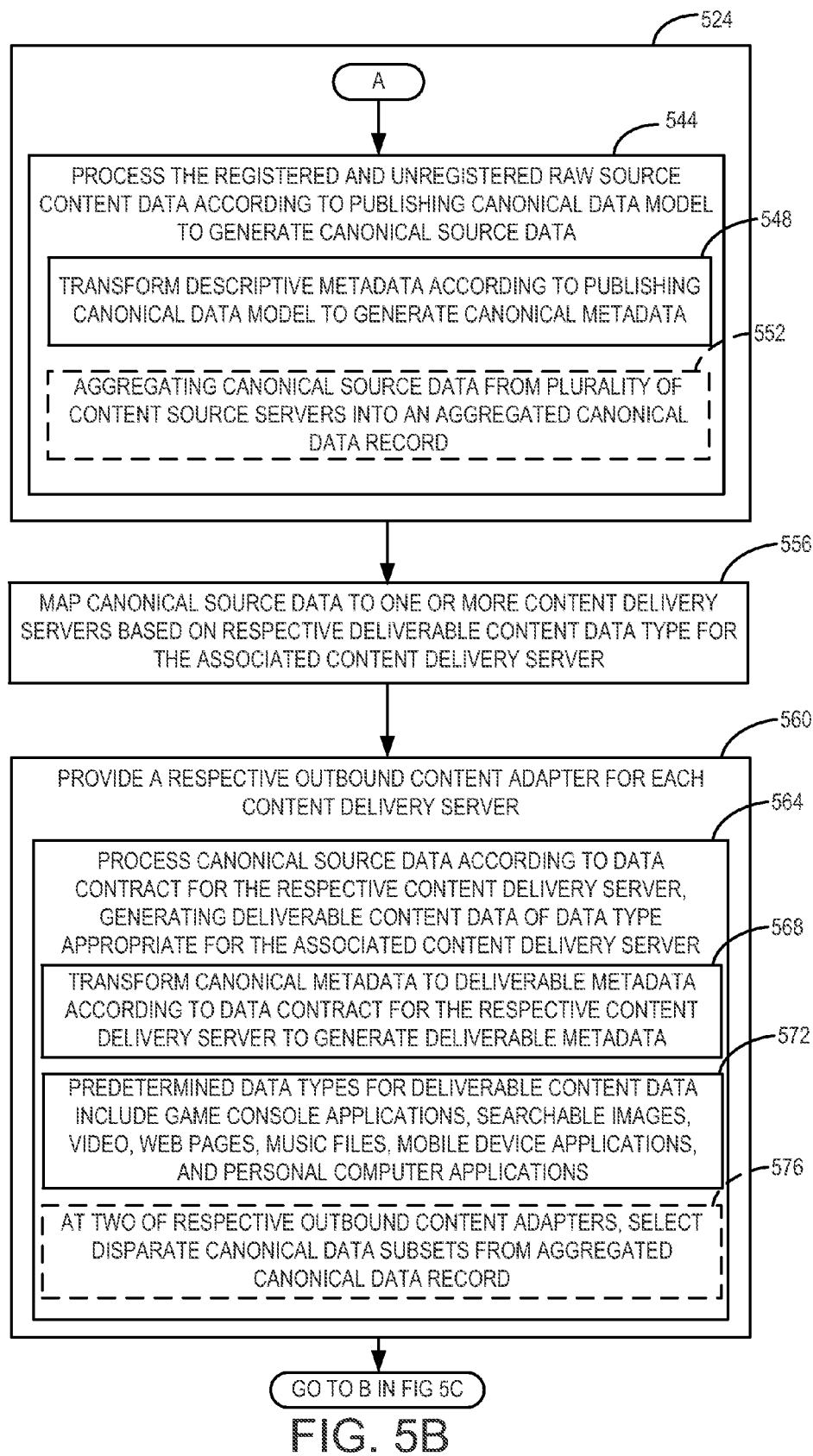
Figure 5C:
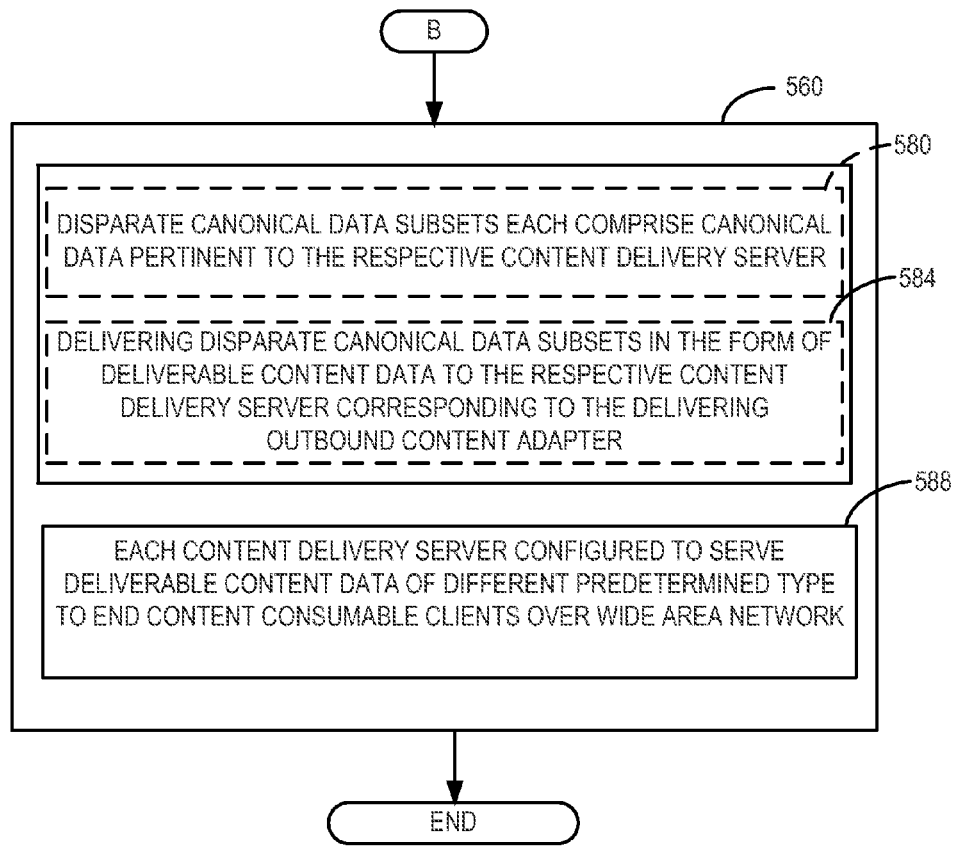

FIGS. 5A, 5B and 5C illustrate a flow chart of a content delivery method 500 according to an embodiment of the present disclosure. The following description of method 500 is provided with reference to the software and hardware components of the content management system 10 described above and shown in FIGS. 1-4. It will be appreciated that method 500 may also be performed in other contexts using other suitable hardware and software components.

With reference to FIG. 5A, at 504 the method 500 includes registering a plurality of content source servers and a plurality of content delivery servers with a content management server. At 508 the plurality of content source servers may include game console content servers, music content servers, and/or mobile device application content servers. At 512 each of the content source servers may be configured to serve raw source content data of a different predetermined type. At 516 the predetermined raw source content data types may include game console applications, music files, and mobile device applications. At 520 the content delivery servers may include game console marketplace servers, search servers, mobile device application marketplace servers, and/or personal computer application marketplace servers.

At 524 the method 500 may include providing a respective inbound content adapter for each of the content source servers. At 528 the method 500 may include receiving the raw source content data from the associated content source server. At 532 the raw source content data may include descriptive metadata. At 536 the descriptive metadata may be selected from the group consisting of product pricing, release dates, product ID, publisher, SKU information, file location, product reviews, game levels, game player modes, and game achievements. At 540 the method 500 may further include receiving unregistered raw source content data from an unregistered content source server that is not registered with the content management server.

Turning now to FIG. 5B, at 544 the method 500 may include processing the registered and unregistered raw source content data according to a publishing canonical data model to thereby generate the canonical source data. At 548 the method may include transforming descriptive metadata according to the publishing canonical data model to general canonical metadata. At 552, in one example the method 500 may include aggregating the canonical source data from a plurality of the content source servers into an aggregated canonical data record.

At 556 the method 500 may include mapping the canonical source data to one or more of the content delivery servers based on a respective deliverable content data type for the associated content delivery server. At 560 the method 500 may include providing a respective outbound content adapter for each of the content delivery servers. At 564 the method 500 may include processing the canonical source data according to the data contract for the respective content delivery server, and thereby generating deliverable content data of a data type that is appropriate for the associated content delivery server. At 568 the method may include transforming the canonical metadata to deliverable metadata according to the data contract for the respective content delivery server, and thereby generate deliverable metadata.

At 572 the predetermined data types for the deliverable content data include game console applications, searchable images, video, web pages, music files, mobile device applications, and personal computer applications. At 576 in one example the method 500 may include, at two of the respective outbound content adapters, selecting disparate canonical data subsets from the aggregated canonical data record.

Turning now to FIG. 5C, at 580 the disparate canonical data subsets may each comprise the canonical data that is pertinent to the respective content delivery server. At 584 the method 500 may include delivering the disparate canonical data subsets in the form of deliverable content data to the respective content delivery server corresponding to the delivering outbound content adapter. It will be appreciated that in other examples disparate canonical data subsets may be selected by more than two outbound content adapters and delivered to respective content delivery servers as described above At 588 each of the content delivery servers may be configured to serve deliverable content data of a different predetermined type to end content consumable clients over a wide area network.

In some embodiments, the above described methods and processes may be tied to a computing system including one or more computers. In particular, the methods and processes described herein may be implemented as a computer application, computer service, computer API, computer library, and/or other computer program product in a computing system that includes one or more computers.

Figure 6:
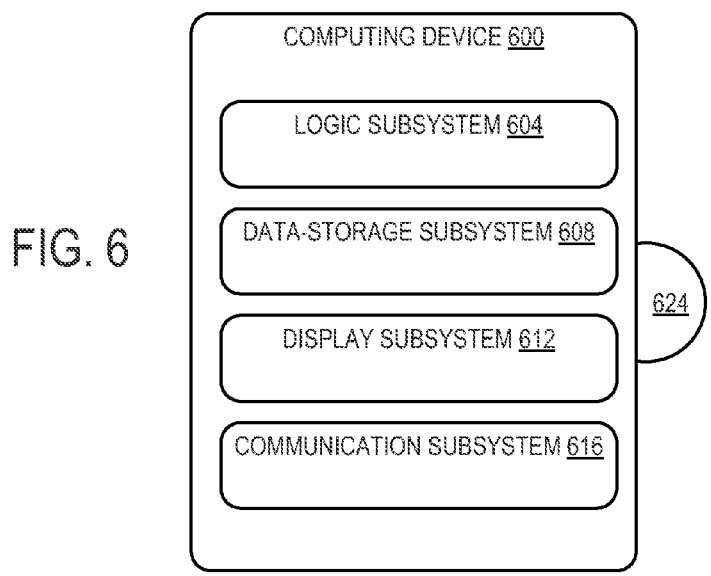
FIG. 6 is a simplified schematic illustration of an embodiment of a computing device.

FIG. 6 schematically shows a nonlimiting embodiment of a computing device 600 that may perform one or more of the above described methods and processes. Computing device 600 is shown in simplified form. It is to be understood that virtually any computer architecture may be used without departing from the scope of this disclosure. In different embodiments, computing device 600 may take the form of a mainframe computer, server computer, desktop computer, laptop computer, tablet computer, home entertainment computer, network computing device, mobile computing device, mobile communication device, gaming device, etc.

As shown in FIG. 6, computing device 600 includes a logic subsystem 604, a data-storage subsystem 608, a display subsystem 612 and a communication subsystem 616. Computing device 600 may optionally include other subsystems and components not shown in FIG. 6. Computing device 600 may also optionally include other user input devices such as keyboards, mice, microphones, game controllers, and/or touch screens, for example.

Logic subsystem 604 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 604 may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-storage subsystem 608 may include one or more physical, persistent devices configured to hold data and/or instructions executable by the logic subsystem 604 to implement the herein described methods and processes. When such methods and processes are implemented, the state of data-storage subsystem 608 may be transformed (e.g., to hold different data). Data-storage subsystem 608 may include mass storage.

Data-storage subsystem 608 may include removable media and/or built-in devices. Data-storage subsystem 608 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-storage subsystem 608 may include devices with one or more of the following characteristics: volatile, nonvolatile, dynamic, static, read/write, read-only, random access, sequential access, location addressable, file addressable, and content addressable. In some embodiments, logic subsystem 604 and data-storage subsystem 608 may be integrated into one or more common devices, such as an application specific integrated circuit or a system on a chip.

FIG. 6 also shows an aspect of the data-storage subsystem 608 in the form of removable computer-readable storage media 624, which may be used to store and/or transfer data and/or instructions executable to implement the methods and processes described herein. Removable computer-readable storage media 624 may take the form of CDs, DVDs, HD-DVDs, Blu-Ray Discs, EEPROMs, and/or floppy disks, among others.

It is to be appreciated that data-storage subsystem 608 includes one or more physical, persistent devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

Display subsystem 612 may be used to present a visual representation of data held by data-storage subsystem 608. As the above described methods and processes change the data held by the data-storage subsystem 608, and thus transform the state of the data-storage subsystem, the state of the display subsystem 612 may likewise be transformed to visually represent changes in the underlying data. The display subsystem 612 may include one or more display devices utilizing virtually any type of technology. Such display devices may be combined with logic subsystem 604 and/or data-storage subsystem 608 in a shared enclosure, or such display devices may be peripheral display devices.

Communication subsystem 616 may be configured to communicatively couple computing device 600 with one or more networks and/or one or more other computing devices. Communication subsystem 616 may include wired and/or wireless communication devices compatible with one or more different communication protocols. As nonlimiting examples, the communication subsystem 616 may be configured for communication via a wireless telephone network, a wireless local area network, a wired local area network, a wireless wide area network, a wired wide area network, etc. In some embodiments, the communication subsystem may allow computing device 600 to send and/or receive messages to and/or from other devices via a network such as the Internet.

The terms "module" and "program," may be used to describe an aspect of the content management system 10 that is implemented to perform one or more particular functions. In some cases, such a module or program may be instantiated via logic subsystem 604 executing instructions held by data-storage subsystem 608. It is to be understood that different modules and programs may be instantiated from the same application, service, code block, object, library, routine, API, function, etc. Likewise, the same module or program may be instantiated by different applications, services, code blocks, objects, routines, APIs, functions, etc. The terms "module" and "program," are meant to encompass individual or groups of executable files, data files, libraries, drivers, scripts, database records, etc.

It is to be appreciated that a "service", as used herein, may be an application program that is executable across multiple user sessions and available to one or more system components, programs, and/or other services. In some implementations, a service may run on a server responsive to a request from a client.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A content delivery method, comprising:
    registering a plurality of content source servers and a plurality of content delivery servers with a content management server, wherein each of the content source servers is configured to serve raw source content data of a different predetermined type, and each of the content delivery servers is configured to serve deliverable content data of a different predetermined type to end content consumable clients over a wide area network, the deliverable content data being formatted according to a data contract for each of the content delivery servers, wherein the plurality of content source servers includes game console content servers, music content servers, and/or mobile device application content servers, and wherein the predetermined raw source content data types include game console applications, music files, and mobile device applications;
    providing a respective inbound content adapter executed on the content management server for each of the content source servers, the respective inbound content adapter being configured to receive the raw source content data from the associated content source server and process the raw source content data according to a publishing canonical data model to thereby generate canonical source data; and
    providing a respective outbound content adapter executed on the content management server for each of the content delivery servers, the respective outbound content adapter being configured to process the canonical source data according to the data contract for the respective content delivery server, and thereby generate deliverable content data of a data type that is appropriate for the associated content delivery server, wherein the content delivery servers include game console marketplace servers, search servers, mobile device application marketplace servers, and/or personal computer application marketplace servers, and wherein the predetermined data types for the deliverable content data include game console applications, searchable images, video, web pages, music files, mobile device applications, and/or personal computer applications,
    receiving raw source content data from the associated content source server according to the publishing canonical data model;
    processing raw source content data according to the publishing canonical data model to generate canonical source data;
    processing canonical source data according to the data contract for the respective content delivery server;
    generating deliverable content data of a data type that is appropriate for the associated content delivery server; and
    delivering deliverable content data originating from the associated content source server and routed through the delivery outbound content adapter at the content management server to the respective content delivery server corresponding to the delivering outbound content adapter.

2. The method of claim 1, wherein the content management server is configured to map the canonical source data to one or more of the content delivery servers based on a respective deliverable content data type for the associated content delivery server.

3. The method of claim 1, wherein the raw source content data includes descriptive metadata, and each of the respective inbound content adapters is further configured to process the raw source content data by transforming the descriptive metadata according to the publishing canonical data model to thereby generate canonical metadata.

4. The method of claim 3, wherein each of the outbound content adapters is further configured to process the canonical metadata by transforming the canonical metadata to deliverable metadata according to the data contract for the respective content delivery server, and thereby generate deliverable metadata.

5. The method of claim 4, wherein the descriptive metadata is selected from the group consisting of product pricing, release dates, product ID, publisher, SKU information, file location, product reviews, game levels, game player modes, and game achievements.

6. The method of claim 1, wherein the content management server is configured to aggregate the canonical source data from a plurality of the content source servers into an aggregated canonical data record.

7. The method of claim 6, wherein two or more of the respective outbound content adapters are configured to:
receive disparate canonical data subsets from the aggregated canonical data record; and
deliver the canonical data subsets to the respective content delivery server corresponding to the delivering outbound content adapter.

8. The method of claim 7, wherein the disparate canonical data subsets each comprise the canonical data that is pertinent to the respective content delivery server.

9. The method of 1, wherein at least one of the respective inbound content adapters is further configured to receive unregistered raw source content data from an unregistered content source server that is not registered with the content management server, and to process the unregistered raw source content data according to the publishing canonical data model to thereby generate the canonical source data.

10. A content management system, comprising:
a content management program including instructions stored in a mass storage of a content management server, the content management program configured to register a plurality of content source servers and a plurality of content delivery servers, wherein each of the content source servers is configured to serve raw source content data of a different predetermined type, and each of the content delivery servers is configured to serve deliverable content data of a different predetermined type to end content consumable clients over a wide area network, the deliverable content data being formatted according to a data contract for each of the content delivery servers, wherein the plurality of content source servers includes game console content servers, music content servers, and/or mobile device application content servers, and wherein the predetermined raw source content data types include game console applications, music files, and mobile device applications;
a publishing service data store including a publishing canonical data model;
a respective inbound content adapter in the content management program on the content management server for each of the content source servers, the respective inbound content adapter being configured to receive the raw source content data from the associated content source server and process the raw source content data according to the publishing canonical data model to thereby generate canonical source data; and
a respective outbound content adapter in the content management program on the content management server for each of the content delivery servers, the respective outbound content adapter being configured to process the canonical source data according to the data contract for the respective content delivery server, and thereby generate deliverable content data of a data type that is appropriate for the associated content delivery server, wherein the content delivery servers include game console marketplace servers, search servers, mobile device application marketplace servers, and/or personal computer application marketplace servers, and wherein the predetermined data types for the deliverable content data include game console applications, searchable images, video, web pages, music files, mobile device applications, and personal computer applications.

11. The content management system of claim 10, wherein the content management program is configured to map the canonical source data to one or more of the content delivery servers based on a respective deliverable content data type for the associated content delivery server.

12. The content management system of claim 10, wherein the raw source content data includes descriptive metadata, and each of the respective inbound content adapters is further configured to process the raw source content data by transforming the descriptive metadata according to the publishing canonical data model to thereby generate canonical metadata.

13. The content management system of claim 12, wherein each of the outbound content adapters is further configured to process the canonical metadata by transforming the canonical metadata to deliverable metadata according to the data contract for the respective content delivery server, and thereby generate deliverable metadata.

14. The content management system of claim 13, wherein the descriptive metadata is selected from the group consisting of product pricing, release dates, product ID, publisher, SKU information, file location, product reviews, game levels, game player modes, and game achievements.

15. The content management system of claim 10, wherein the content management program is configured to aggregate the canonical source data from a plurality of the content source servers into an aggregated canonical data record.

16. The content management system of claim 15, wherein two or more of the respective outbound content adapters are configured to:
receive disparate canonical data subsets from the aggregated canonical data record; and
deliver the canonical data subsets to the respective content delivery server corresponding to the delivering outbound content adapter.

17. The content management system of claim 16, wherein the disparate canonical data subsets each comprise the canonical data that is pertinent to the respective content delivery server.

18. The content management system of 10, wherein at least one of the respective inbound content adapters is further configured to receive unregistered raw source content data from an unregistered content source server that is not registered with the content management server, and to process the unregistered raw source content data according to the publishing canonical data model to thereby generate the canonical source data.

19. A content delivery method, comprising:
registering a plurality of content source servers and a plurality of content delivery servers with a content management server, wherein each of the content source servers is configured to serve raw source content data, including descriptive metadata, of a different predetermined type, and each of the content delivery servers is configured to serve deliverable content data of a different predetermined type to end content consumable clients over a wide area network, the deliverable content data being formatted according to a data contract for each of the content delivery servers, wherein the plurality of content source servers includes game console content servers, music content servers, and/or mobile device application content servers, and wherein the predetermined raw source content data types include game console applications, music files, and mobile device applications;

providing a respective inbound content adapter in the content management program on the content management server for each of the content source servers, the respective inbound content adapter being configured to receive the raw source content data including the descriptive metadata from the associated content source server and process the raw source content data according to a publishing canonical data model to thereby generate canonical source data including canonical metadata;

providing a respective outbound content adapter in the content management program on the content management server for each of the content delivery servers, the respective outbound content adapter being configured to process the canonical source data including the canonical metadata according to the data contract for the respective content delivery server, and thereby generate the deliverable content data, including deliverable metadata, of a data type that is appropriate for the associated content delivery server, wherein the content delivery servers include game console marketplace servers, search servers, mobile device application marketplace servers, and/or personal computer application marketplace servers, and wherein the predetermined data types for the deliverable content data include game console applications, searchable images, video, web pages, music files, mobile device applications, and personal computer applications receiving raw source content data from the associated content source server according to the publishing canonical data model;

processing raw source content data according to the publishing canonical data model to generate canonical source data;

processing canonical source data according to the data contract for the respective content delivery server;

generating deliverable content data of a data type that is appropriate for the associated content delivery server; and delivering deliverable content data originating from the associated content source server and routed through the delivery outbound content adapter at the content management server to the respective content delivery server corresponding to the delivering outbound content adapter.

20. The method of claim 19, wherein the content management server is further configured to aggregate the canonical source data from a plurality of the content source servers into an aggregated canonical data record, and two or more of the respective outbound content adapters are configured to:

receive disparate canonical data subsets from the aggregated canonical data record; and deliver the canonical data subsets to the respective content delivery server corresponding to the delivering outbound content adapter.

* * * * *